INVENTORS.
Almar T. Widiger
Lloyd E. Lefevre
BY

AGENT

United States Patent Office
3,558,330
Patented Jan. 26, 1971

3,558,330
PACKAGING FILM AND PACKAGE
Almar T. Widiger, Midland, and Lloyd E. Lefevre, Bay City, Mich., assignors to The Dow Chemical Company, Midland, Mich., a corporation of Delaware
Filed Sept. 21, 1967, Ser. No. 669,430
Int. Cl. B65b 25/06; B32b 27/08
U.S. Cl. 99—174                          4 Claims

ABSTRACT OF THE DISCLOSURE

A packaging film particularly suited for machine overwrapping of oxygen-sensitive materials is prepared by simultaneous extrusion of film having an inner barrier layer such as a Saran resin composition and having outer layers of materials of widely differing sealing characteristics, and a package of a comestible and the film.

---

This invention relates to an improved packaging film and a package obtained therefrom, and more particularly relates to a multi-layer packaging film particularly suited for packaging of oxygen-sensitive materials.

Many packaging films of transparent synthetic resinous materials are known. Frequently, it is desired to form a packaging film by vacuum forming or other thermoforming procedure to provide a cavity into which the material to be packaged is placed; subsequently the package is closed by sealing such as heat sealing and simultaneously separated from one or more webs of film forming the package by a packaging machine. Various laminated packaging films are employed for such form, fill and seal automatic packaging applications. Some of the laminates are prepared by the simultaneous extrusion of different resin compositions wherein the characteristics of various resinous layers combine to provide a usable product. A film which can be formed by simultaneous extrusion is particularly desirable in that the resultant multi-layer film can be closely controlled with regard to the quantity of any one or all of the components and the proper adjustment of the extrusion conditions of almost any desired thickness of product is readily obtained in a rapid and economical manner. For many applications, a packaging film is required to provide oxygen and water vapor barrier characteristics. The film must have sufficient strength to be handled by automatic machinery and formed into packages; it must be capable of heat sealing over a relatively wide range of temperatures and it must be able to be cut readily in such a manner that a clean edge is obtained. Many laminates have one or more of the desirable characteristics for such a package, but none provide all of the desired characteristics, such as ease of preparation; control of proportions of thickness; transparency; sealing range; coherency at sealing temperatures, and the like. A broad heat sealing temperature range is particularly desirable as the film requires less care and attention by operating personnel than does a film having a narrow heat sealing temperature range; it also permits less exotic controls for heat sealing shoes in a packaging machine and permits the rate of packaging to be varied without the necessity of re-adjusting heat sealing equipment temperatures.

It would be desirable if there were available an improved multi-layer gas barrier film particularly suited for use in automatic packaging machinery.

It would also be desirable if there were available an improved multi-layer packaging film which was transparent and exhibited good heat seal strength over a broad range of temperatures.

It would also be advantageous if there were available an improved package of a transparent heat sealable film.

These benefits and other advantages in accordance with the present invention are obtained in an improved packaging film having a first surface layer of a low melt temperature resin, a second surface layer of a high melt temperature resin and an intermediate layer of a gas barrier resin, the three layers being adhered together to form a transparent packaging film.

Also contemplated within the scope of the present invention are packages of comestibles consisting of a film in accordance with the invention overwrapping and enclosing a foodstuff.

Further features and advantages of the present invention will become more apparent from the following specification when taken in connection with the drawing wherein.

Figure 1:
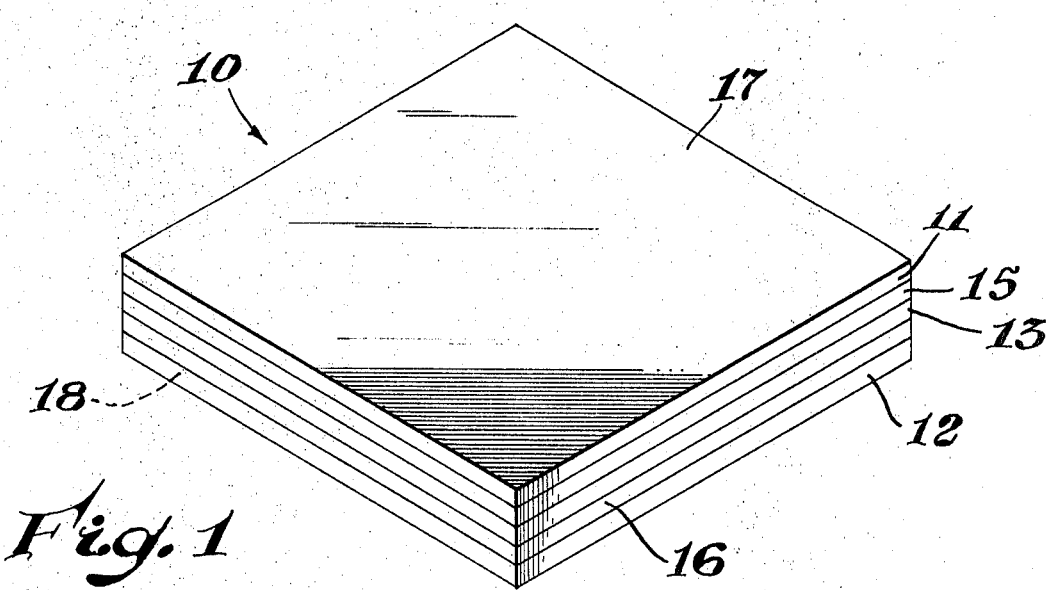
FIG. 1 is a schematic representation of a portion of film in accordance with the present invention.

In FIG. 1 there is schematically illustrated a view of a packaging film generally designated by the reference numeral 10. The packaging film 10 comprises a first surface layer 11 and a second surface layer 12. The surface layer 11 is composed of a material heat sealable at high temperatures. The second layer 12 is composed of a resinous composition which has a low heat sealing temperature relative to the heat sealing temperature of the layer 11. A barrier layer 13 is disposed between the surface layers 11 and 12. The barrier layer 13 is a synthetic resinous composition having high resistance to the passage of gases and moisture vapor. The barrier layer 13 is adhered to the surface layers 11 and 12 by thermoplastic adhesive layers 15 and 16, respectively. The film 10 has a first major surface 17 and a second major surface 18. Interfaces between the layers 11, 12, 13, 15 and 16 are generally parallel to the surfaces 17 and 18.

Figure 2:
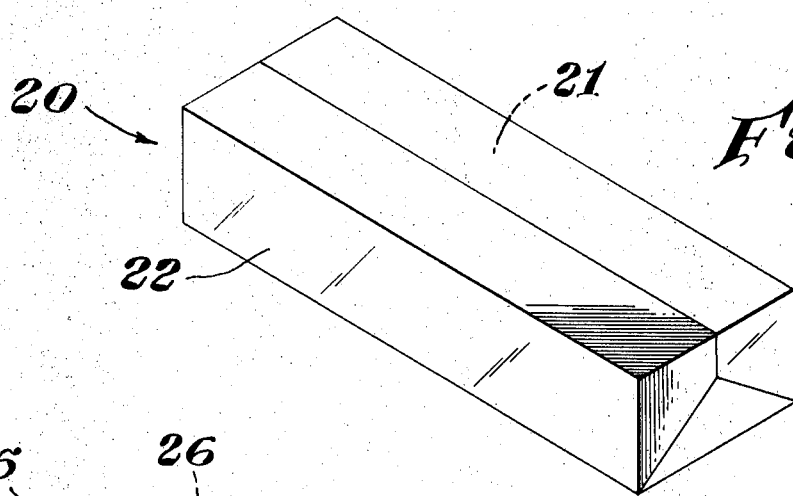
FIGS. 2 and 3 depict packages in accordance with the present invention.

FIG. 2 schematically represents a package 20. The package 20 is comprised of a foodstuff 21 disposed within an overwrap 22. The overwrap 22 is of layered construction similar to the film 10 of FIG. 1. The overwrap 22 is hermetically sealed to prevent the passage of gas.

Figure 3:
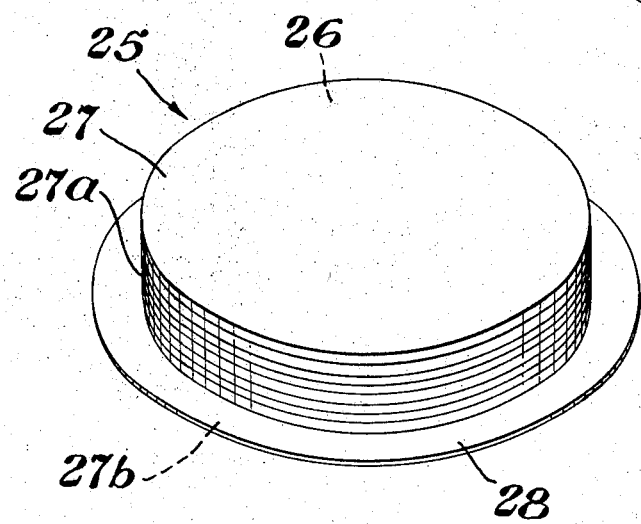

FIG. 3 depicts a package 25 somewhat similar to the package 20 of FIG. 2. The package 25 comprises a processed meat 26 disposed within a hermetically sealed overwrap 27, such as the film 10 of FIG. 1, containing a barrier layer. The overwrap 27 comprises a preformed cup-shaped portion 27a, a flat circular portion 27b, the portions 27a and 27b are joined to each other by means of a circumferential heat seal forming a flange or fin 28.

Multi-layer film prepared by the simultaneous extrusion of a plurality of different heat plastified resins is well known in the art. Suitable equipment is described, for example, in U.S. Letters Patent 3,320,636; 3,275,725 and 3,223,761. Often, it is desirable to provide an adhesive between adjacent layers of a layered film stretcher. Such adhesives desirably are of a synthetic resinous thermoplastic nature and beneficially are readily evaluated for suitability as an adhesive by simultaneous extrusion of a two-layer film wherein the adhesion of the material being evaluated can be determined by conventional sealing strength tests.

Advantageously, film in accordance with the present invention is produced by simultaneous extrusion to form a non-oriented film such as by chill roll casting or by extruding a tube, stretching the film with entraped air under conditions which do not result in orientation. Generally, the lack of orientation contributes significantly to the formability of the resultant film and oftentimes substantially reduces or eliminates many production and handling problems. The term "non-orientation" signifies without significant orientation which results in significant shrinkage at heat sealing temperatures; that is, the degree of molecular orientation is substantially less than the degree which is obtained when an oriented film is desired.

Beneficially, for most applications, a wide variety of barrier materials may be employed in the central layer of films in accordance with the present invention. Particularly suited as barrier layers are combinations of vinylidene chloride polymers, vinyl chloride polymers, vinylidene fluoride polymers and extrudable mixtures thereof. The requirement for the central layer is that the material be extrudable within a sheath of another polymer and that the composition have the desired gas and moisture vapor transmission barrier characteristics. Particularly advantageous and beneficial are extrudable compositions of vinylidene chloride polymers, wherein the polymers contain at least about 70 weight percent vinylidene chloride, the remainder being one or more olefinically unsaturated monomers copolymerizable therewith. Suitable vinylidene chloride polymers are prepared utilizing such comonomers as methyl, ethyl, isobutyl, butyl, octyl and 2-ethylhexyl acrylates and methacrylate; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride and allyl glycidyl ether. Commercially available light stabilizers may also be incorporated in the vinylidene chloride material such as tertiary-butyl salol. Other barrier compositions which may be used with benefit in films in accordance with the present invention are vinyl chloride polymers which contain a predominant amount of vinyl chloride therein, and beneficially, fluorocarbon polymers, fluorohydrocarbon polymers and fluorohalohydrocarbon polymers may also be used with benefit. Such materials as polyvinyl chloride, polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluoroethylene and vinyl chloride, chlorotrifluoroethylene-vinylidene fluoride and tetrafluoroethylene and the like. Generally, for economic reasons, the vinylidene chloride polymers are employed, as they are most readily available at relatively low cost.

Beneficially, in the extrusion of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for the extrusion is substantially reduced and the probability of decomposition of the polymer in the extruder is lowered. Typical plasticizers which are employed in the vinylidene or Saran combinations are acetyl tributyl citrate, epoxidized soybean oil (commercially available under the trade designation of Paraplex G–60) and dibutyl sebacate.

The external layers of the film may be prepared from a wide variety of materials, but particularly advantageous for the low melt temperature resins are polyolefin resins. By the term "polyolefin resins" is meant polyethylene, polypropylene resinous polymers of ethylene and propylene, polymers of ethylene and/or propylene with minor proportions of olefinically unsaturated monomers such as, for example, those alpha-olefins having from 2 to 8 carbon atoms such as 1-butene, 1-pentene, 1-hexene, 1-heptene 1-octene and mixed higher alpha-olefins. Other hydrocarbons useful for making copolymers with ethylene and propylene include divinylbenzene, allene, dimethallyl, and isopentene. Comonomers which can broadly be used include mono-substituted ethylenes such as 1-pentene, vinylcyclohexane, allyl benzene, $C_8$–$C_{14}$ mixed alpha-olefins, styrene, allyl naphthalene, and the like, 1,1-disubstituted ethylene such as alpha-methyl styrene, 2-methylbutene-1 mixed alpha- and beta-pinenes, camphene and the like, 1,2-disubstituted ethylenes such as indene, acenaphthylene, cyclopentene, norbornylene, cyclohexene, trans-stilbene, 2-pentene and the like, conjugated dienes and trienes such as pentadiene-1,2, 1,2-dihydrobenzene, allo-ocimene, and cyclopentadiene, unconjugated dienes such as mixed octadienes, hexadiene-1,5, 2,5-dimethylhexadiene-1,5, 1,4-dihydrobenzene, bicycloheptadiene, bicyclopentadiene, 4-vinylcyclohexene -1, and 4,7-diphenyl decadiene-1,9, acetylenes such as isopropenyl acetylene and phenyl acetylene, chloroolefins such as beta-methallyl chloride and chloromethyl norbornylene, and m-chlorostyrene, ethers and epoxides, esters such as vinyl butyrate, vinyl acetate, and methyl acrylate, and nitrogen compounds such as vinyl carbazole, 4-vinyl pyridine and acrylonitrile, and mixtures and blends thereof.

Typical high melt temperature resins are nylon, such as nylon 6, nylon 66, nylon 7 and the like; extrudable polyester resins; extrudable polyurethanes; polypropylene and polymers of propylene with other monomers copolymerizable therewith. The terms "high melt temperature resin" and "low melt temperature resin" are relative.

A particularly advantageous polymer for the preparation of film in accordance with the present invention are polymers of from about 60 to 96 weight percent ethylene and 4 to 40 weight percent vinyl acetate. Advantageously, the ethylene-vinyl acetate polymer is eminently suitable for use as low melt temperature resins and as an adhesive between the barrier layer and the high melt temperature resin. Thus, one particularly advantageous embodiment of the invention provides a four-layer film having one surface of ethylene vinyl acetate polymer, one surface of a high melt temperature resin, a barrier resin adjacent the ethylene vinyl acetate polymer surface layer and a layer of ethylene vinyl acetate polymer adhering the high melt temperature resin to the barrier.

Also contemplated within the scope of high melt temperature resins are materials such as polypropylene, polyvinyl fluoride, fluorinated polyethylene, copolymers of tetrafluoroethylene and hexafluoropropylene and rigid vinyl chloride polymers.

Suitable polymer films for the practice of the present invention are readily identified by subjecting them to a heat seal test which is performed employing a bar type heat sealer having a heated bar measuring one by ten inches and employing two mil thick film, the heat sealing bar adapted to selectively engage an unheated thermally insulated jaw coated with polytetrafluoroethylene and resiliently backed. A heat sealing test is accomplished by placing two layers of film between the jaws which are heated to a predetermined temperature, the jaws providing a pressure of 30 pounds per square inch on the film being evaluated at the desired temperature for a period of one second (dwell time). Samples of a given film are subjected to the sealing apparatus over a varying range of temperatures (heat sealer bar temperature) and the strength of the resultant heat seal determined. The heat sealing range is then taken as lying within a range in which a seal is obtained for about one half of the maximum strength of the heat seal at low temperatures and the upper limit of the sealing range is determined in a like manner. Failure in the higher temperature range is generally due to melting of the film. The heat sealing range as determined by the foregoing test is not necessarily the useful heat sealing range of the same film in an automatic packaging machine where dwell time, pressures, speed, contamination and the like may vary. However, for any particular machine and particular thickness of the film, the heat seal range of temperature as determined by the foregoing experiment generally is employed as a convenient guide and once sealing conditions are determined for one film a factor is obtained and is readily applied to other films considering such variables as film thickness, variation, film temperature, air movement and the like.

Exemplary of some of the many packaging films which are useful in the practice of the present invention are nylon 6 or polycaprolactam film which heat seals within a range of from about 400–475° F. and is generally resistant to heating for periods longer than is required to make a seal over the range of 200°–275° F.; polycarbonate films which are a polybisphenol-A carbonate having the formula

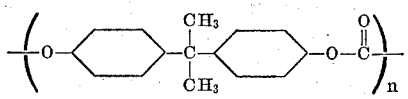

are heat resistant at temperatures up to 270° F., do not readily heat seal and are usable as a high melt temperature resin in the practice of this invention; polypropylenes having melt indices of from 2–30 which in general heat seal within the range of 280°–400° F. and are heat resistant up to the range of 190°–220° F.; polytetrafluoroethylene which is heat resistant up to about 500° F.; polyvinyl fluoride which heat seals in the range of from about 400°–425° F., and is heat resistant up to temperatures of 200°–250° F.; a copolymer of tetrafluoroethylene and hexafluoropropylene which heat seals in the range of 540° to about 700° F., and is heat resistant up to 400°–525° F.; polytrifluorotrichloroethylene which is heat resistant up to 300°–390° F.; resinous copolymers of propylene with ethylene containing copolymerized therein from 3–10 percent ethylene are heat resistant up to the range of about 190°–250° F. and heat seal over the range of 305°–375° F.; chlorinated polyethylene containing about 60 weight percent chlorine is heat resistant up to the range of about 250°–300° F.; rigid polyvinyl chloride which is heat resistant up to a temperature of 150–200° F. and heat seals over the range of 300°–420° F.; plasticized polyvinylchloride which is heat resistant over the range of 150°–200° F. and heat seals over a temperature range of 315°–360° F.; a copolymer of 87 weight percent vinyl chloride and 13 weight percent vinyl acetate is resistant to heat in the range of 150°–200° F. and heat seals within the range of 275°–360° F.; low density polyethylene (having densities of 0.910 to 0.925) are heat resistant up to the range of 180°–200° F. and heat seal over the range of 250°–400° F.; medium density of polyethylene, that is, polyethylene having densities of about 0.926 to 0.940, are heat resistant up to a temperature of about 220° F. and heat seal over a temperature range of 250°–400° F.; high density polyethylene, that is, polyethylene having a density of 0.941 to 0.965, is heat resistant up to a temperature of about 250° F. and heat seals over a range of 275°–400° F.; copolymers of 72 weight percent ethylene and 28 weight percent vinyl acetate heat seal over a temperature range of 150°–280° F.; copolymers of 80 weight percent ethylene and 20 weight percent ethyl acrylate heat seal over a range of 150°–280° F.; copolymers of 80 weight percent ethylene and 20 weight percent isobutylacrylate heat seal over a range of 150°–280° F.; copolymers of 97 weight percent ethylene and 3 weight percent acrylic acid heat seal over a range of 220°–350° F.; polyethylene terephthalate is heat resistant up to about 300° F. and polystyrene foam up to about 212° F. A particularly advantageous high temperature heat resistant film is one prepared from a resin sold under the trade designation of Delrin acetal resin.

In considering the heat resistance of the film and the heat seal temperature, it must be realized that the heat seal temperature is the heat sealing temperature of the test sealer bar and not necessarily the temperature reached by the film during the sealing operation.

It is critical to the practice of the present invention that the outer layers no opposite sides of the film have a heat sealing differential of at least 30° F. and beneficially, even greater; that is, the side of the film having the surface layer of the low melt temperature resin should have a minimum heat sealing value at least 30° F. below the minimum heat sealing temperature of the high melt temperature resin disposed on the opposite disposed face. Thus, the resultant composite film is readily heat sealed without danger of distortion in the temperature range between the lower heat sealing temperatures of the opposite faces. Further, as the high melt temperature resin is maintained above its heat sealing temperature, it maintains sufficient rigidity to be severed in automatic equipment without stringing, distorting or otherwise deforming, and allows the composite film to be cut cleanly. Due to the heat sealing range of the composite film, temperatures of heat sealing bars in automatic equipment may be set in such a manner that speed variations in packages or units per minute may be made which are not possible with other non-oriented packaging films.

By way of further example, a multilayer film (1) is prepared by simultaneous extrusion and chill roll casting to form a multilayer film having as a high melt temperature layer a copolymer of 95.5 weight percent propylene, 4.5 weight percent ethylene, having a thickness of 2.15 mils, adhered to a layer of a copolymer of 72 weight percent ethylene and 28 weight percent vinyl acetate having a thickness of 0.40 mil, which in turn is adhered to a layer of a copolymer of 85 weight percent vinylidene chloride and 15 weight percent vinyl chloride formulated with one part per hundred tetrasodium pyrophosphate and 3 parts per hundred of a copolymer of 78 weight percent ethylene and 32 weight percent vinyl acetate. The vinylidene chloride-vinyl chloride layer in turn is adhered to a low melt temperature layer having a thickness of 1.50 mils of a copolymer of 72 weight percent ethylene and 28 weight percent vinyl acetate. The composite film has a thickness of 4.5 mils. The ethylene-propylene polymer layer has a heat seal range of 305°–375° F. and the ethylene-vinyl acetate surface has a heat seal range of 150°–280° F. For comparative purposes, two 4.5 mil thick multilayer films are prepared (2) employing the previously identified vinylidene chloride-vinyl chloride copolymer composition having low density polyethylene as the outer layers. (3) A film of a 5-layer laminate of the above-identified propylene-ethylene copolymer adhered to a vinylidene chloride center layer wherein the ethylene-propylene layer is disposed on the outer surfaces. The three films are then processed in an automatic packaging machine (Standard Packaging 114–F machine) with the following results: the 4-layer film (1) in accordance with the invention exhibits at the sealing temperature a seal strength of 1500 pounds per square inch, shows excellent cut-off properties and excellent heat forming. The comparative films (2) and (3) each exhibit a seal strength at the sealing temperature of 500 pounds per square inch and poor cut-off characteristics. The ethylene-surfaced three layer film (2) shows very poor heat forming or vacuum drawing properties, whereas the film (3) with the propylene-ethylene copolymer surfaces shows good heat forming properties.

Similar beneficial results are obtained employing a five layer film having as a first or surface layer 1.60 mils of propylene-ethylene copolymer, 4.5 weight percent ethylene, 95.5 weight percent propylene adhered to an adhesive layer of 28 percent ethylene-vinyl acetate copolymer having a thickness of 0.4 mil in turn adhered to a 0.45 mil thick layer of the vinylidene chloride-vinyl chloride copolymer, which in turn is adhered to a 0.45 mil thick layer of 28 weight percent vinyl acetate copolymer of ethylene vinyl acetate, which in turn is adhered to a 1.63 mil thick layer of polyethylene having a density of 0.920, to provide a film having total thickness of 4.5 mils. This 5-layer film is also prepared by simultaneous extrusion as in the previous illustration.

A useful packaging film having a broad heat seal range is prepared by the simultaneous extrusion of high density polyethylene, 28 weight percent vinyl acetate copolymer of ethylene vinyl acetate, and an 85 weight percent vinylidene chloride-15 weight percent vinyl chloride copolymer to form a four layer film having a one mil thick layer of high density polyethylene on one surface adhered to a 0.20 mil thick layer of ethylene vinyl acetate copolymer in turn adhered to a 0.4 mil thick layer of vinylidene chloride-vinyl chloride copolymer which in turn is adhered to a surface or heat seal layer 0.9 mil in thickness of ethylene-vinyl acetate copolymer. The resultant film is eminently suitable for packaging coffee, cheese, meat and the like and is readily prepared by simultaneous extrusion.

Other advantageous composite films having different resins on their surface are shown in the following table. The first resin named is the high temperature resin and the last named is the heat seal or low melt temperature resin. The resins designated at the extreme left and extreme right are the surface layers and the inner layers are disposed in the order shown. Excellent heat sealing and barrier characteristics are obtained. The following abbreviations are employed in the table:

HDPE—high density polyethylene
VeCl$_2$—vinylidene chloride copolymer
EVA—ethylene-vinyl acetate copolymer
PP—polypropylene
PVC—polyvinyl chloride
LDPE—low density polyethylene
EIBA—ethylene-isobutylene acrylate
SVCN—copolymer of styrene and acrylonitrile
ABS—acrylonitrile-butadiene-styrene copolymer
EP—ethylene-propylene copolymer
EAA—ethylene-acrylic acid copolymer
VeFl—vinylidene fluoride
CPE—chlorinated polyethylene
PTFE—polytetrafluoroethylene
Acetal—polymerized formaldehyde end groups capped with tertiary butyl groups
PB—polybutene
PS—polystyrene
EEA—ethylene-ethyl acrylate

TABLE

HDPE-VeCl$_2$-EVA
PP-PVC-LDPE
Nylon-PVC-LDPE
SVCN-PVC-EIBA[1]
Phenoxy-VeCl$_2$-LDPE
ABS-PVC-EVA[1]
EP-VeCl$_2$-EVA
EP-EVA-VeCl$_2$-EVA
PP-EVA-VeCl$_2$-EVA
EAA-EVA-PVC-EVA
Polycarbonate-EVA-PVC-LDPE
LDPE-EVA-PVC-EVA
PP-EVA-VeFl-VeCl$_2$-LDPE
Polyurethane-EVA-VeCl$_2$-EVA
HDPE-CPE-PVC-EVA
Nylon-EVA-VeCl$_2$-PE
Mylar-EVA-VeCl$_2$-PE
PS-EVA-PVC-PE[1]
SVCN-EVA-VeCl$_2$-PE[1]
Phenoxy-EIBA-VeCl$_2$-PE
PTFE-EVA-PVC-PE
ABS-EVA-VeCl$_2$-EVA
Polyurethane-EVA-VeCl$_2$-EVA
Acetal-EVA-VeCl$_2$-EVA
PP-EVA-CPE-EVA
PP-EVA-VeCl$_2$-PB
PP-EVA-VeCl$_2$-ethylene-butylene copolymer VA)
PP-EVA-VeCl$_2$-EVA-PE
PS-EVA-PVC-EVA-PE[1]
Phenoxy-EVA-VeCl$_2$-EVA-PE
ABS-EEA-VeCl$_2$-EEA-PE[1]
SVCN-EAA-VeCl$_2$-EAA-PE[1]

[1] Combinations suited for dielectric sealing only.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An improved vacuum formable thermoplastic transparent packaging film consisting essentially of
   a first surface layer of a high melt temperature resin which is a polymer of from 90 to 98 weight percent propylene and 10 to 2 weight percent ethylene,
   a second surface layer of a resin which is a polymer of from 96 to 60 weight percent ethylene and 4 to 40 weight percent vinyl acetate,
   a third or intermediate layer of a gas barrier which is a polymer containing at least 70 weight percent vinylidene chloride and at least one olefinically unsaturated monomer copolymerizable therewith,
   a fourth layer disposed between the first and third layers, the fourth layer being a layer of the hereinbefore described ethylene vinyl acetate copolymer and adhering the first and third layers together, the second layer adhering to the third layer.

2. The film of claim 1 in cooperative combination with a foodstuff wherein the low melt temperature resin is disposed adjacent the foodstuff and defines a hermetically sealed package.

3. The film of claim 2 including a preformed cup shaped portion and a flat portion, the preformed portion and the flat portion being heat sealed to each other wherein the low melt temperature resin of each portion is in face to face engagement.

4. The film of claim 3 wherein the foodstuff is a processed meat.

References Cited

UNITED STATES PATENTS

| | | | |
|---|---|---|---|
| 2,679,969 | 6/1954 | Richter | 99—174UX |
| 3,114,736 | 12/1963 | Bartl | 99—174UX |
| 3,131,069 | 4/1964 | Goller | 99—174 |
| 3,205,077 | 9/1965 | Hammond | 99—174 |
| 3,214,074 | 10/1965 | Schechter | 99—174UX |
| 3,222,191 | 12/1965 | Steiner | 99—174 |
| 3,232,895 | 2/1966 | Klein | 99—174UX |
| 3,246,061 | 4/1966 | Blatz | 99—174UX |
| 3,274,004 | 9/1966 | Curler | 99—174X |
| 3,390,704 | 7/1968 | Woodell | 161—177X |
| 3,442,687 | 5/1969 | Hagan | 117—76X |
| 3,445,324 | 5/1969 | Curler | 99—174X |
| 3,453,173 | 7/1969 | Isley | 161—256X |
| 3,446,631 | 5/1969 | Samuels | 99—171 |

FOREIGN PATENTS 1,011,608  12/1965  Great Britain _____ 161—254

FRANK W. LUTTHER, Primary Examiner

R. HALPER, Assistant Examiner

U.S. Cl. X.R.

99—171, 178; 117—76; 161—254